US012789238B2

(12) United States Patent
Matsuzaki et al.

(10) Patent No.: US 12,789,238 B2
(45) Date of Patent: Nov. 10, 2026

(54) SCRAPING DEVICE

(71) Applicant: THREEBOND CO., LTD., Hachioji (JP)

(72) Inventors: Keita Matsuzaki, Hachioji (JP); Yuki Okawa, Hachioji (JP); Toshiyuki Takahashi, Hachioji (JP)

(73) Assignee: THREEBOND CO., LTD., Tokyo (JP)

( * ) Notice: Subject to any disclaimer, the term of this patent is extended or adjusted under 35 U.S.C. 154(b) by 211 days.

(21) Appl. No.: 18/973,600

(22) Filed: Dec. 9, 2024

(65) Prior Publication Data

US 2025/0196194 A1 Jun. 19, 2025

(30) Foreign Application Priority Data

Dec. 14, 2023 (JP) ................................ 2023-210866

(51) Int. Cl.
*B08B 1/16* (2024.01)
*B08B 1/30* (2024.01)

(52) U.S. Cl.
CPC ................ *B08B 1/165* (2024.01); *B08B 1/30* (2024.01)

(58) Field of Classification Search
CPC ........... B08B 1/165; B08B 1/30; B08B 15/00; B08B 1/40; B08B 1/50; B05B 15/52; B05B 15/50; B05C 11/023; B05C 5/0216; B05C 5/0254
USPC .......................................................... 15/93.1
See application file for complete search history.

(56) References Cited

U.S. PATENT DOCUMENTS 5,070,568 A * 12/1991 Wilcox ................... B08B 9/021 15/93.1
5,138,969 A * 8/1992 Thielmann ............. F23D 14/50 118/317
5,278,392 A * 1/1994 Takacs .................. B23K 9/295 219/137.43

(Continued)

FOREIGN PATENT DOCUMENTS

AU 2025223850 A1 * 3/2026 ............... A47L 1/05
CN 101646500 B * 3/2012 ........... B05B 15/557

(Continued)

OTHER PUBLICATIONS

Extended European Search Report, dated May 9, 2025, which was issued for the corresponding European Patent Application No. 24217563.6, 8 pages.

*Primary Examiner* — Monica L Perry
(74) *Attorney, Agent, or Firm* — LUCAS & MERCANTI, LLP

(57) ABSTRACT

A scraping device to be used for an applying system has a nozzle which is formed such that an outer wall surface is tapered toward a distal end. The scraping device includes: a pair of scraping units, each of which has a corner portion for scraping a viscous material adhering to the outer wall surface; and a driving unit which causes the pair of scraping units to approach to and separate from each other. The nozzle is movable to be temporarily arranged between the pair of scraping units. The pair of scraping units move to approach to each other when the nozzle is arranged between the pair of scraping units, and approach to each other until the corner portions abut each other due to movement as retraction of the nozzle from a portion between the pair of scraping units.

5 Claims, 6 Drawing Sheets

(56) References Cited

U.S. PATENT DOCUMENTS

| | | | | | |
|---|---|---|---|---|---|
| 5,686,000 | A * | 11/1997 | Nilsson | B23K 9/32 15/93.1 |
| 5,809,603 | A * | 9/1998 | White | B08B 9/021 15/104.18 |
| 5,845,357 | A * | 12/1998 | Anderson | B05B 15/52 15/93.1 |
| 8,321,986 | B2 * | 12/2012 | Nakazima | B23K 9/328 15/93.1 |
| 10,464,158 | B2 * | 11/2019 | Denzer | A46B 13/001 |
| 2009/0249567 | A1 * | 10/2009 | Nakazima | B23K 9/32 15/93.1 |

FOREIGN PATENT DOCUMENTS

| | | | | |
|---|---|---|---|---|
| CN | 208824844 | U * | 5/2019 | |
| CN | 110124920 | A | 8/2019 | |
| CN | 110124920 | B * | 7/2020 | B05B 15/50 |
| JP | 2002361151 | A * | 12/2002 | |
| JP | 6430056 | B1 * | 11/2018 | B05C 11/10 |

* cited by examiner

SCRAPING DEVICE

CROSS-REFERENCE TO RELATED APPLICATION

This application claims priority to Japanese Patent Application No. 2023-210866 filed on Dec. 14, 2023, the contents of which are incorporated herein by reference in their entirety.

TECHNICAL FIELD

The present invention relates to a scraping device.

BACKGROUND ART

Among systems which apply viscous materials, nozzles which discharge viscous materials in various shapes and of various discharging types are present. In related art about discharge nozzles, a discharge nozzle has been known which discharges a material in a planar shape from a distal end of a nozzle (which can be referred to as a slit nozzle, a flat nozzle, or the like).

CITATION LIST

Patent Literature

Patent Literature 1: Japanese Patent Laid-Open No. 2002-361151

SUMMARY OF INVENTION

Technical Problem

The present inventors have focused on the fact that a discharged viscous material can adhere to a distal end of a (discharge) nozzle as in Patent Literature 1, and have been conducting intensive studies about a device which scrapes a viscous material adhering to a nozzle.

Accordingly, an object of the present invention is to provide a scraping device that scrapes a viscous material which can adhere to a distal end of a nozzle.

Solution to Problem

A scraping device according to one aspect of the present invention which solves the above problem is used for an applying system having a nozzle which is formed such that an outer wall surface is tapered toward a distal end and includes: scraping units; and a driving unit. The scraping units are configured to form a pair, and each of the scraping units has a contact part for scraping a viscous material adhering to the outer wall surface. The driving unit causes the pair of scraping units to approach to and separate from each other. The nozzle is movable to be temporarily arranged between the pair of scraping units. The pair of scraping units move to approach each other when the nozzle is arranged between the pair of scraping units and approach each other until the contact parts abut each other due to movement as retraction of the nozzle from a portion between the pair of scraping units.

Effect of the Invention

A scraping device according to the present invention can scrape a material which can adhere to a distal end of a nozzle.

DESCRIPTION OF EMBODIMENTS

First Embodiment

Embodiments for carrying out the present invention will hereinafter be described in detail with reference to drawings. The embodiments described herein are raised as examples for embodying the technical ideas of the present invention but do not limit the present invention. Further, all of other embodiments, practical examples, operating techniques, and so forth which can be carried out and are conceivable by a person having ordinary skill in the art or the like without departing from the scope of the gist of the present invention are included in the scope and the gist of the present invention and also included in the invention recited in the claims and the equivalent scope thereof.

In addition, for convenience of illustration and understanding, the drawings attached to the present specification might schematically be expressed while scales, vertical and horizontal dimension ratios, shapes, and so forth are appropriately changed from those in reality, but those are examples and do not limit interpretation of the present invention.

Further, in the following descriptions, the descriptions will be made by using ordinal numerals such as “first” and “second”, but those are used for convenience and do not define certain order unless otherwise mentioned.

Figure 1:
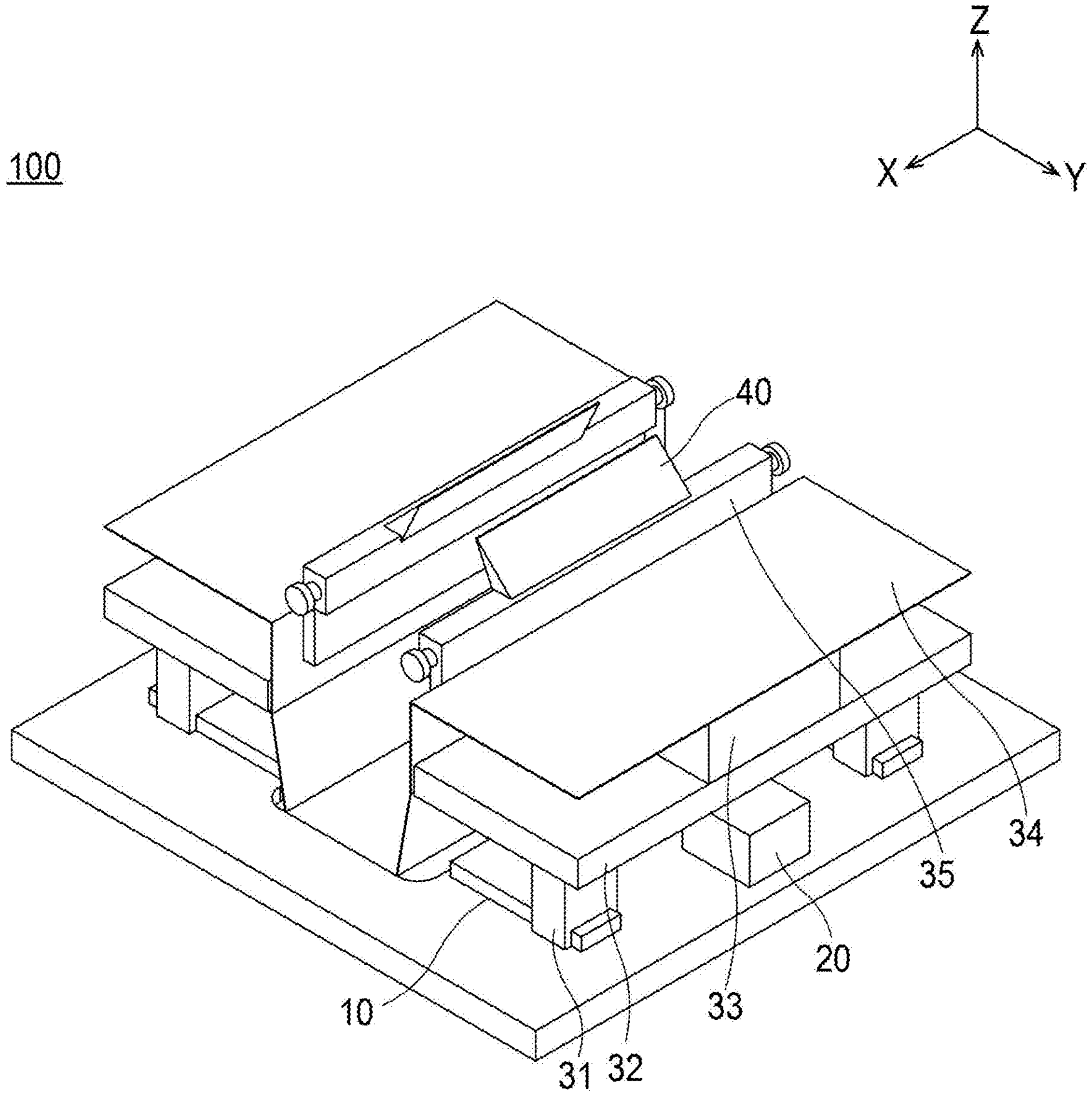
FIG. 1 is a perspective view schematically illustrating a scraping device according to one embodiment of the present invention.
Figure 2:
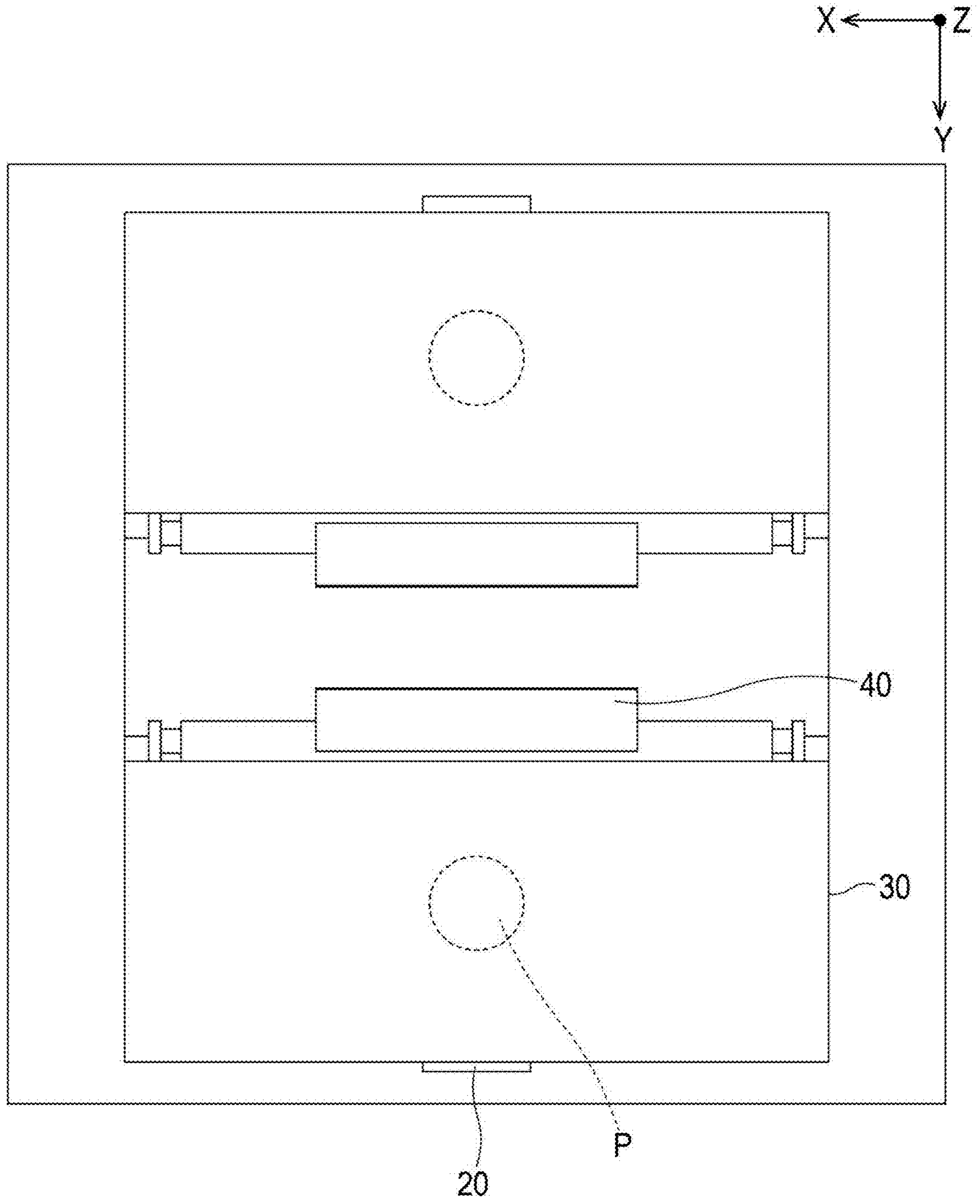
FIG. 2 is a plan view illustrating the scraping device.
Figure 3:
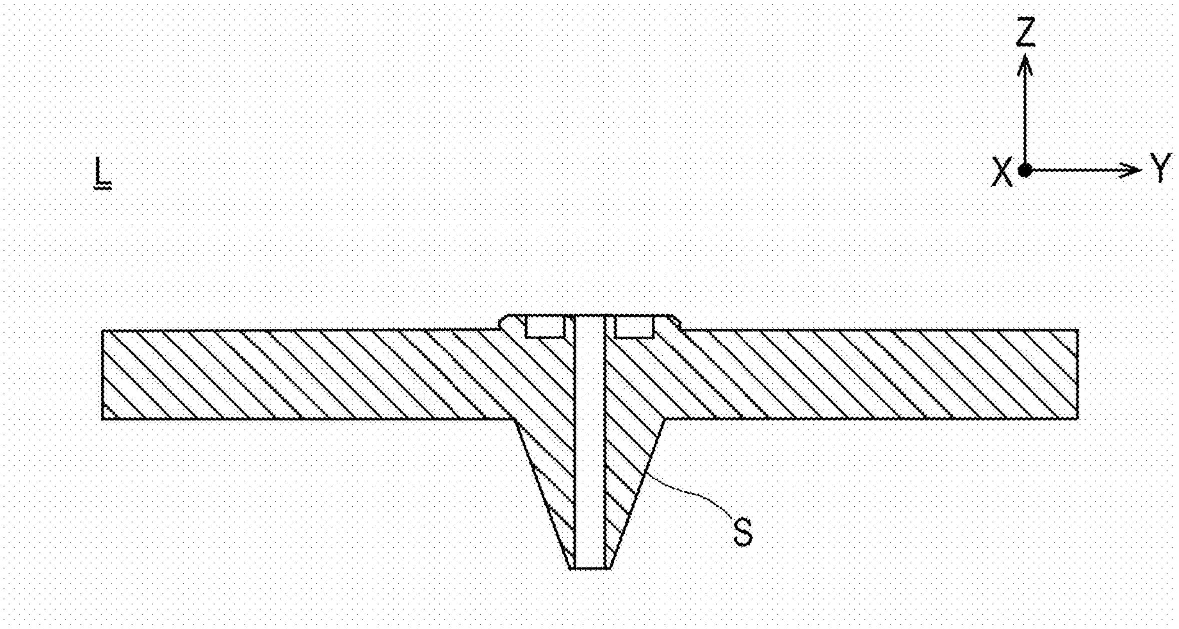
FIG. 3 is a cross-sectional view of a nozzle.
Figure 4:
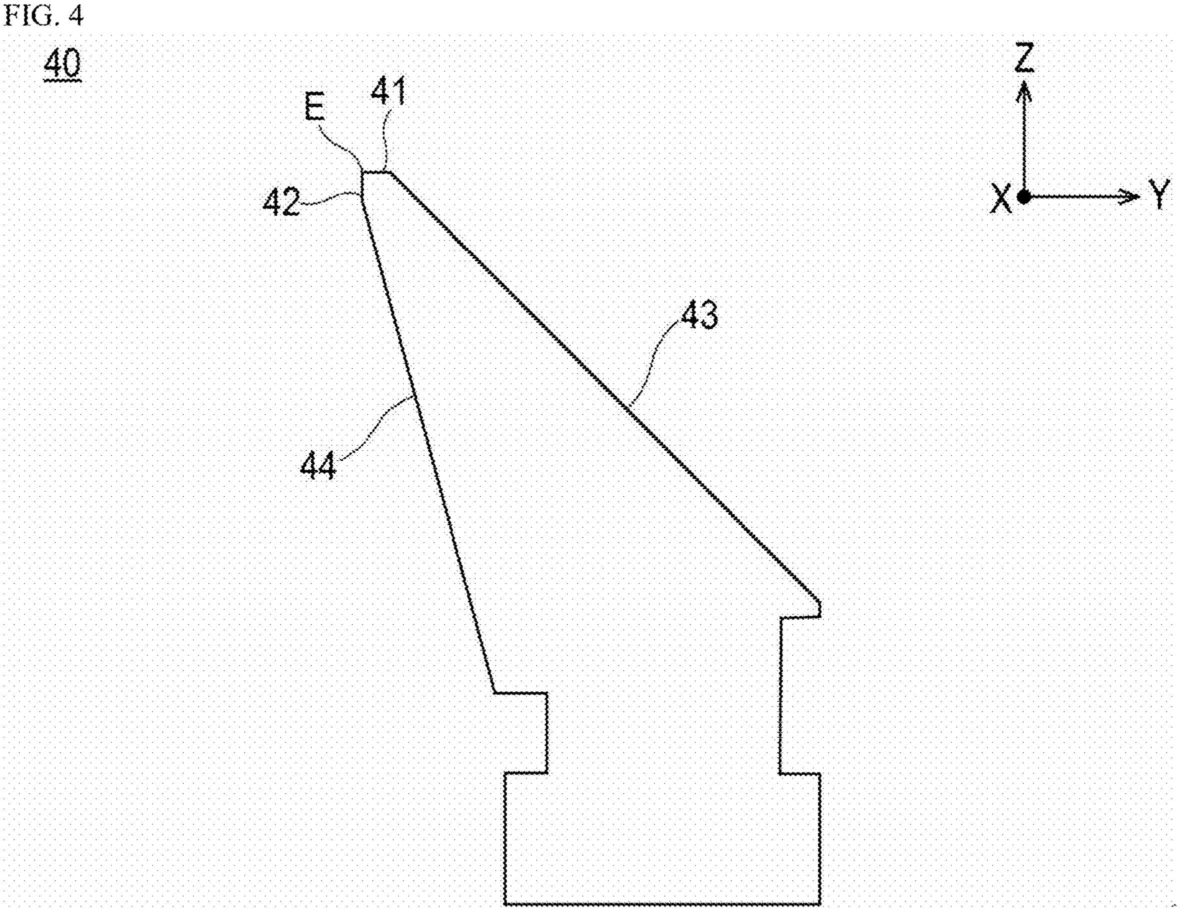
FIG. 4 is a front view illustrating a scraping unit.
Figure 5:
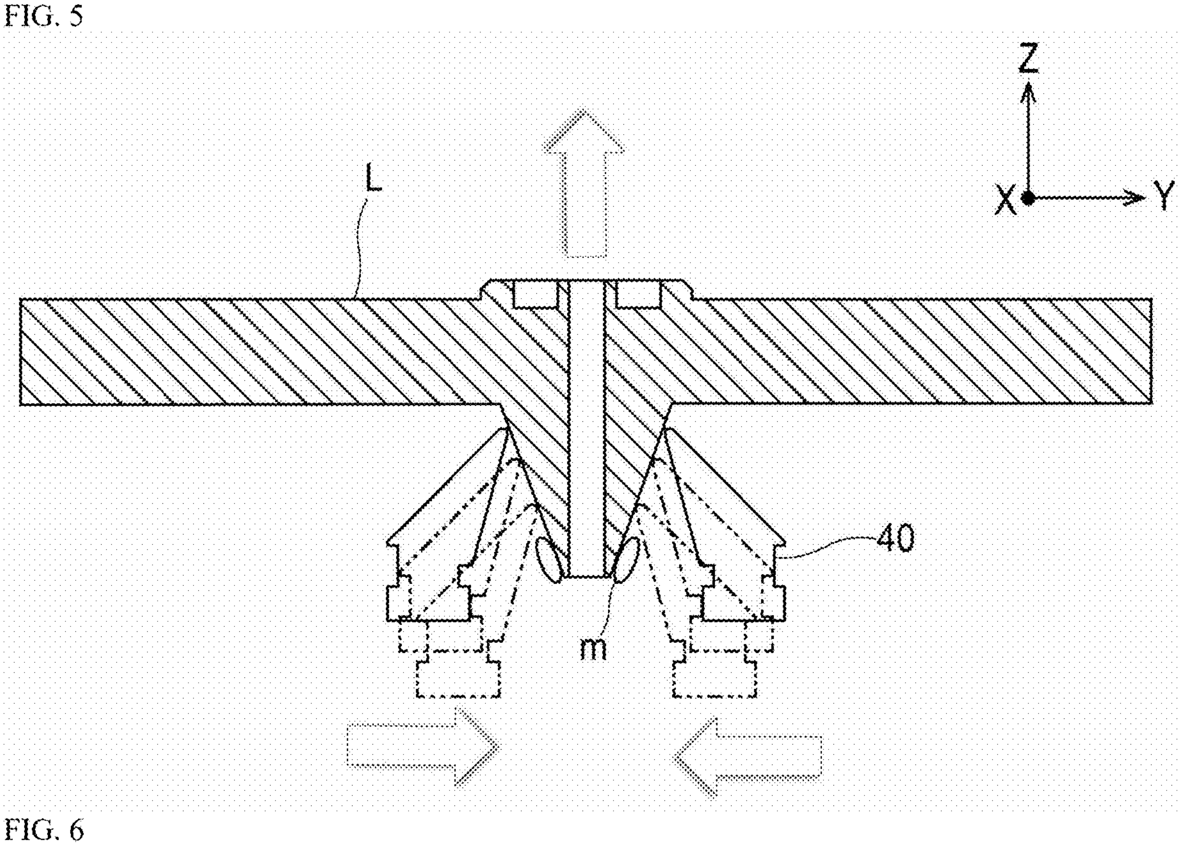
FIG. 5 is a diagram illustrating a situation where scraping units scrape off a viscous material adhering to a distal end portion of the nozzle.
Figure 6:
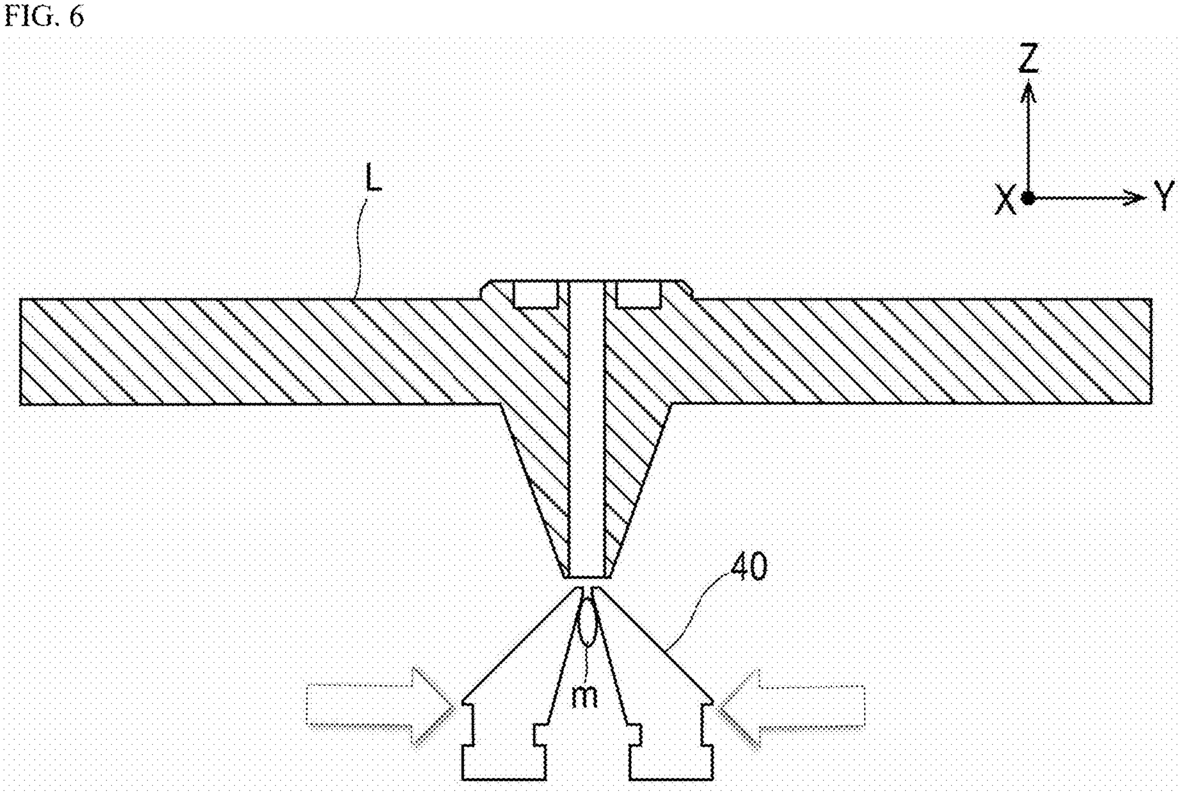
FIG. 6 is a diagram illustrating a situation where the scraping units scrape off the viscous material adhering to the distal end portion of the nozzle.
Figure 7:
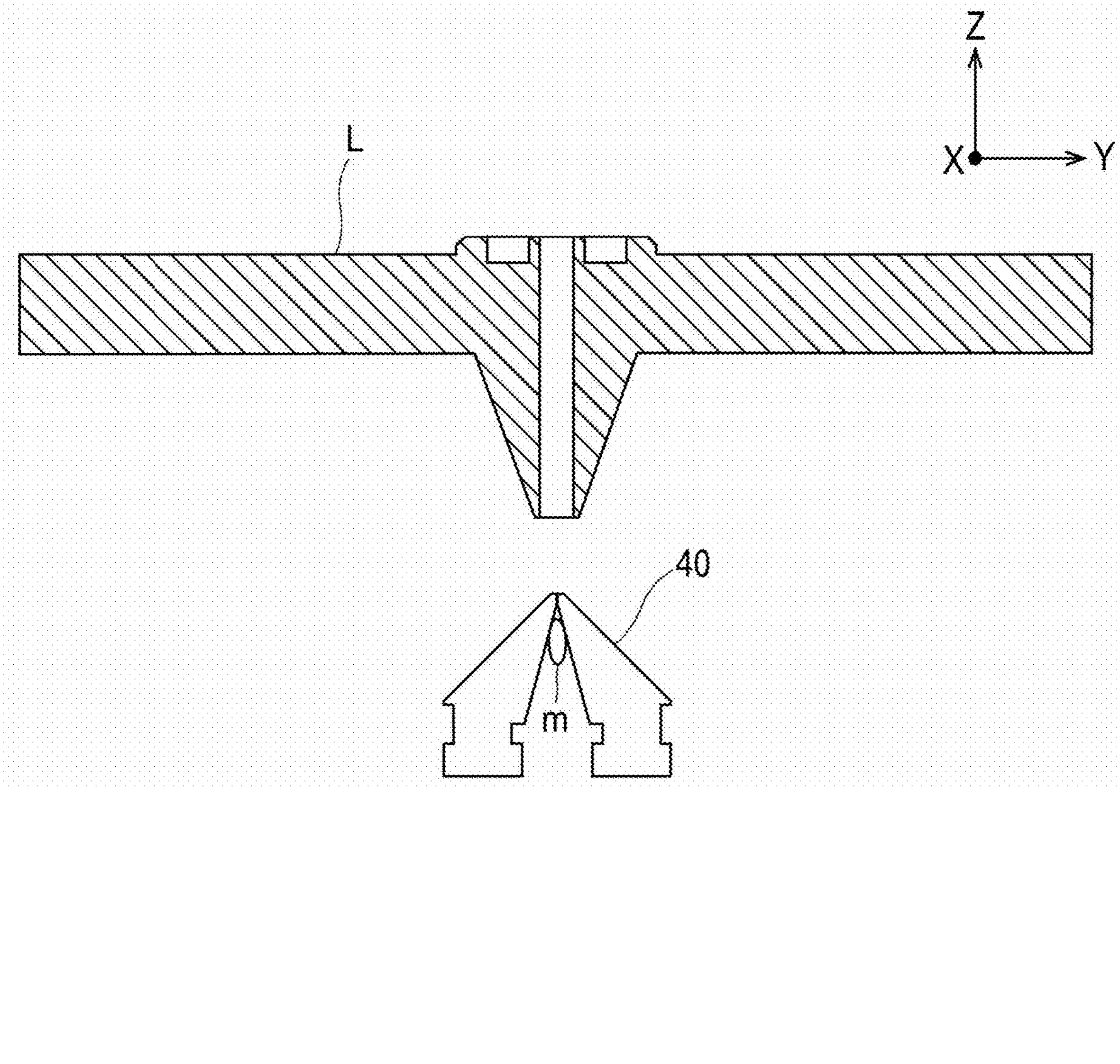
FIG. 7 is a diagram illustrating a situation where the scraping units scrape off the viscous material adhering to the distal end portion of the nozzle.

FIG. 1 is a perspective view schematically illustrating a scraping device 100 according to one embodiment of the present invention. FIG. 2 is a plan view illustrating the scraping device 100. FIG. 3 is a cross-sectional view illustrating a nozzle L which configures an applying system 1. FIG. 4 is a front view illustrating a scraping unit 40. FIG. 5 to FIG. 7 are diagrams illustrating situations where the scraping units 40 scrape off a viscous material adhering to a distal end portion of the nozzle L.

Here, a viscous material m to be scraped by the scraping device 100 exhibits thixotropy by adding a filler to a viscous body. The viscous material m exhibiting thixotropy might move not only to a distal end portion of a nozzle but also around to an outer wall surface, and it is necessary to scrape a nozzle distal end and the outer wall surface. As the viscous bodies, oil, epoxy resins, silicone resins, urethane resins, (meth)acrylic resins, and so forth are raised, but the viscous bodies are not limited to those. As the fillers, inorganic fillers, organic fillers, and so forth are raised. As the inorganic fillers, glass powder, hollow glass powder, silica powder, amorphous silica powder, alumina powder, talc powder, mica powder, calcium carbonate powder, aluminum nitride powder, kaolin clay powder, dried clay mineral powder, dried diatomite powder, metal powder, and so forth are raised, but the inorganic fillers are not limited to those. As the organic fillers, silicone rubber powder, poly(meth) acrylic powder, polystyrene powder, polyurethane powder, carbon powder, hollow plastic powder, and so forth are raised, but the organic fillers are not limited to those. In addition, air bubbles dispersed in the viscous body can be one of the fillers. It is preferable that an average particle diameter of the filler be 0.001 to 100 μm, and as measurement methods for the average particle diameter, a laser diffraction method and so forth are raised, but the measurement methods are not limited to those. Further, as shapes of the fillers, perfect spheres, spheric shapes, flake shapes, fiber shapes, irregular shapes, and so forth are raised, but the shapes of the fillers are not limited to those. A hydrophilic treatment, or a hydrophobic treatment by a silane coupling agent or the like may be performed for a surface of the filler, and core-shell powder in which a shell is formed for a core as a particle of the filler may also be used. In particular, the viscous material m exhibiting thixotropy indicates a viscous material which has a value of structural viscosity ratio of greater than 1.0.

The scraping device 100 according to the present embodiment is used when separating the viscous material m, which is discharged from the applying system, from the nozzle L. The applying system can widely be used for apparatuses including a force-feed pump, a dispenser, and so forth. The nozzle L is formed such that an outer wall surface S has an inclined surface that tapers toward a distal end in a vertical direction. The nozzle L is formed such that a cross section illustrated in FIG. 3 is caused to extend by a certain length in a depth direction X. In the following, a coordinate system will be used for descriptions about the scraping device. X denotes a depth direction of the scraping device, and a depth direction X is set. Y denotes a lateral direction of the scraping device, and a lateral direction Y is set. Z denotes a vertical direction of the scraping device, and a vertical direction Z is set.

(Scraping Device)

The scraping device 100 is configured to scrape the viscous material m, which is discharged from the nozzle L of the above-described applying system, from the nozzle L. The scraping device 100 includes rails 10, driving units 20, moving units 30, and scraping units 40. In the following, each configuration will be described in detail.

The rails 10 are arranged to extend in the lateral direction Y orthogonal to the depth direction X in which the nozzle L extends. A mechanical element including the moving unit 30 and the scraping unit 40 is movably arranged on the rails 10.

The driving unit 20 is configured as a drive source which moves the mechanical element including the moving unit 30 and the scraping unit 40 to approach to and separate from another mechanical element in the lateral direction Y along the rails 10. The driving unit 20 is configured to include a motor or an actuator.

The moving unit 30 is configured to horizontally move in the lateral direction Y by the driving unit 20. The moving unit 30 includes engagement portions 31 which are engaged with the rails 10, a stand portion 32 which is placed on the engagement portions 31, an upper-side stand portion 33 which is arranged at a general center of the stand portion 32, a top plate 34 which is placed on an upper portion of the upper-side stand portion 33, and a mounting portion 35 on which the scraping unit 40 is mounted. The scraping unit 40 is detachably mounted on an upper portion of the mounting portion 35. In the present embodiment, the mounting portion 35 is configured to be provided with a groove on which the scraping unit 40 is mounted, but as long as the scraping unit 40 can firmly be fixed to a predetermined position, a specific form of the mounting portion 35 does not have to include the groove, and a configuration is possible in which a bolt or the like is provided.

The scraping units 40 are configured to form a pair so as to scrape off the viscous material m adhering to the nozzle L of the applying system 1. In the present embodiment, the scraping unit 40 is configured with a thermoplastic resin such as POM (a polyacetal resin or a polyoxymethylene resin). The scraping unit 40 is formed to extend in the depth direction X in FIG. 4. When viewed in a planar view as illustrated in FIG. 2, the scraping unit 40 is configured to be rotatable, together with the mounting portion 35, around a rotation axis P so as to adjust a contact state with the nozzle L in the depth direction X.

As illustrated in FIG. 4, the scraping unit 40 is configured to include a horizontal surface 41, a vertical surface 42, a first inclination portion 43, and a second inclination portion 44. The horizontal surface 41 is a part which extends in a generally horizontal direction (lateral direction Y), and a corner portion E as a part which contacts the nozzle L is formed in a distal end portion. The horizontal surface 41 is configured to have an area which is as small as possible because liquid is accumulated in scraping when its area is large and the liquid re-adheres to a nozzle side surface.

The vertical surface 42 is a part which extends in an approximately vertical direction Z and is configured to form the corner portion E (a contact part for scraping the viscous material adhering to the outer wall surface), together with the horizontal surface 41, as a part, which contacts the nozzle L, in a distal end portion. The vertical surfaces 42 are configured to butt each other when the scraping units 40 approach each other. Because when the vertical surface 42 is large, scraped liquid comes out upward and downward and this can become a cause of re-adhesion of the liquid to the nozzle L, the vertical surface 42 is configured to have an area which is as small as possible.

The first inclination portion 43 is continuous with the horizontal surface 41 and is formed to be inclined to further separate outward from the nozzle L toward a lower area in a planar view. The first inclination portion 43 is a surface on which liquid adhering to the horizontal surface 41 in scraping flows, a flow speed becomes faster as the first inclination portion 43 becomes closer to the vertical, the liquid is not deposited when cleaning is successionally performed, and re-adhesion to the nozzle is less likely to occur. Thus, it is preferable that the first inclination portion 43 be close to the vertical.

The second inclination portion 44 is a surface continuous with the vertical surface 42 and is configured to be inclined to further separate outward from the nozzle L toward the lower area in the planar view. The second inclination portion 44 is a place on which liquid resulting from cleaning mainly flows and can secure a larger space as the second inclination portion 44 becomes closer to the horizontal when the second inclination portion 44 is completely closed and can temporarily store a larger amount of liquid. Accordingly, this is advantageous in a continuous operation. Thus, it is preferable that the second inclination portion 44 be as close as possible to the horizontal.

A control unit is configured to include a CPU and so forth, to be electrically connected with the driving unit 20 and so forth, and to control actions of the driving unit 20 and so forth. The nozzle L can be set to move in a predetermined place, and a signal which notifies a position of the nozzle L can be output from the nozzle L at each movement. The control unit can control the driving unit 20 so as to move the scraping unit 40 as the pair of scraping unit 40 in accordance with a signal about the position which is received from the nozzle L. The pair of scraping units 40 move to approach each other when the nozzle L is arranged between the scraping units 40 by the control unit and approach until they abut each other due to movement as retraction of the nozzle L from a portion between the pair of scraping units 40.

Further, as illustrated in FIG. 2, the mounting portion 35 constituting the moving unit 30 is configured to be rotatable around the rotation axis P as a center so as to adjust the orientation of the scraping unit 40. In such a configuration, adjustment can be performed such that when the scraping unit 40 is pressed onto the nozzle L, the scraping unit 40 is pressed onto the nozzle L by a uniform pressure for the nozzle L.

Next, a description will be made about a method of cleaning the nozzle L by using the scraping device 100 according to the present embodiment. Here, it is assumed that the nozzle L of the applying system 1 is configured to be movable to enter and be retracted from a portion between a place to which the viscous material m is applied and the scraping units 40. In other words, the nozzle L is configured to be movable to be temporarily arranged between the pair of scraping units 40.

The nozzle L first discharges the viscous material m at a place (not illustrated) where the viscous material m is discharged and thereafter approaches the portion between the pair of scraping units 40. When receiving a signal about the own position from the nozzle L, the control unit controls the driving units 20, the driving units 20 move the moving units 30, and the scraping units 40 thereby approach each other.

As a result, because the nozzle L is positioned between the pair of scraping units 40, the scraping units 40 approach each other so as to interpose the distal end of the nozzle L as illustrated in FIG. 5. Here, when the nozzle L attempts to move to be retracted from the portion between the scraping units 40, separation of the nozzle L and approach of the scraping units 40 are combined, and the scraping units 40 thereby move toward the distal end portion along inclinations of the distal end portion of the nozzle L. As a result, the scraping units 40 abut each other, and parts where they abut each other are positioned around the distal end portion of the nozzle L as illustrated in FIG. 6. As illustrated in FIG. 7, the scraping units 40 retain so as to separate the viscous material m which is discharged from the nozzle L, from the nozzle L. Accordingly, scraping of the viscous material m from the nozzle L is performed. Until the pair of scraping units 40 abut each other and finish scraping the viscous material m, the nozzle L does not move to a predetermined position where application of the viscous material m is started.

As described above, the scraping device 100 according to the present embodiment is used for the applying system having the nozzle L which is formed such that the outer wall surface S is tapered toward the distal end and includes the scraping units 40 and the driving units 20. The scraping units 40 are configured to form a pair, and each of the scraping units 40 has the corner portion E for scraping the viscous material m adhering to the outer wall surface S. The driving unit 20 is configured to move the pair of scraping units 40 to approach to and separate from each other. The nozzle L is configured to be movable to be temporarily arranged between the pair of scraping units 40. The pair of scraping units 40 move to approach each other when the nozzle L is arranged between the pair of scraping units 40 and approach each other until the corner portions E abut each other due to movement as retraction of the nozzle L from the portion between the pair of scraping units 40. In such a configuration, the viscous material m adhering to the distal end portion of the nozzle L can be scraped off in association with an action of the nozzle L.

Further, in the scraping unit 40, the contact part is formed with the corner portion E at which the horizontal surface 41 extending in the horizontal direction (lateral direction Y) intersects with the vertical surface 42 extending in the vertical direction Z. In such a configuration, when the pair of scraping units 40 approach in a generally horizontal direction and abut each other, the viscous material m can be separated from the nozzle L and scraped off.

Further, the scraping unit 40 includes the first inclination portion 43 and the second inclination portion 44. The first inclination portion 43 is continuous with the horizontal surface 41 and is inclined to be positioned further outward from the nozzle L toward the lower area in the planar view. The second inclination portion 44 is continuous with the vertical surface 42 and is inclined to be positioned further outward from the nozzle L toward the lower area in the planar view. In such a configuration, the viscous material m is caused to flow on the first inclination portion 43 and the second inclination portion 44, and re-adhesion of the viscous material m to the nozzle L can thereby be prevented or inhibited.

Further, the pair of scraping units 40 are formed to extend in the depth direction X which intersects with the vertical direction Z. The pair of scraping unis 40 is mounted on the mounting portions 35 which are moved together with the pair of scraping units 40 by the driving units 20. The mounting portion 35 is configured to be rotatable so as to adjust a direction of the scraping unit 40. In such a configuration, even if the pair of scraping units 40 are about to contact each other non-uniformly in a thickness direction (depth direction X), and the viscous material m can smoothly be scraped off from the nozzle L by adjusting a contact manner with the nozzle L around the rotation axis P as the center.

Second Embodiment

Figure 8:
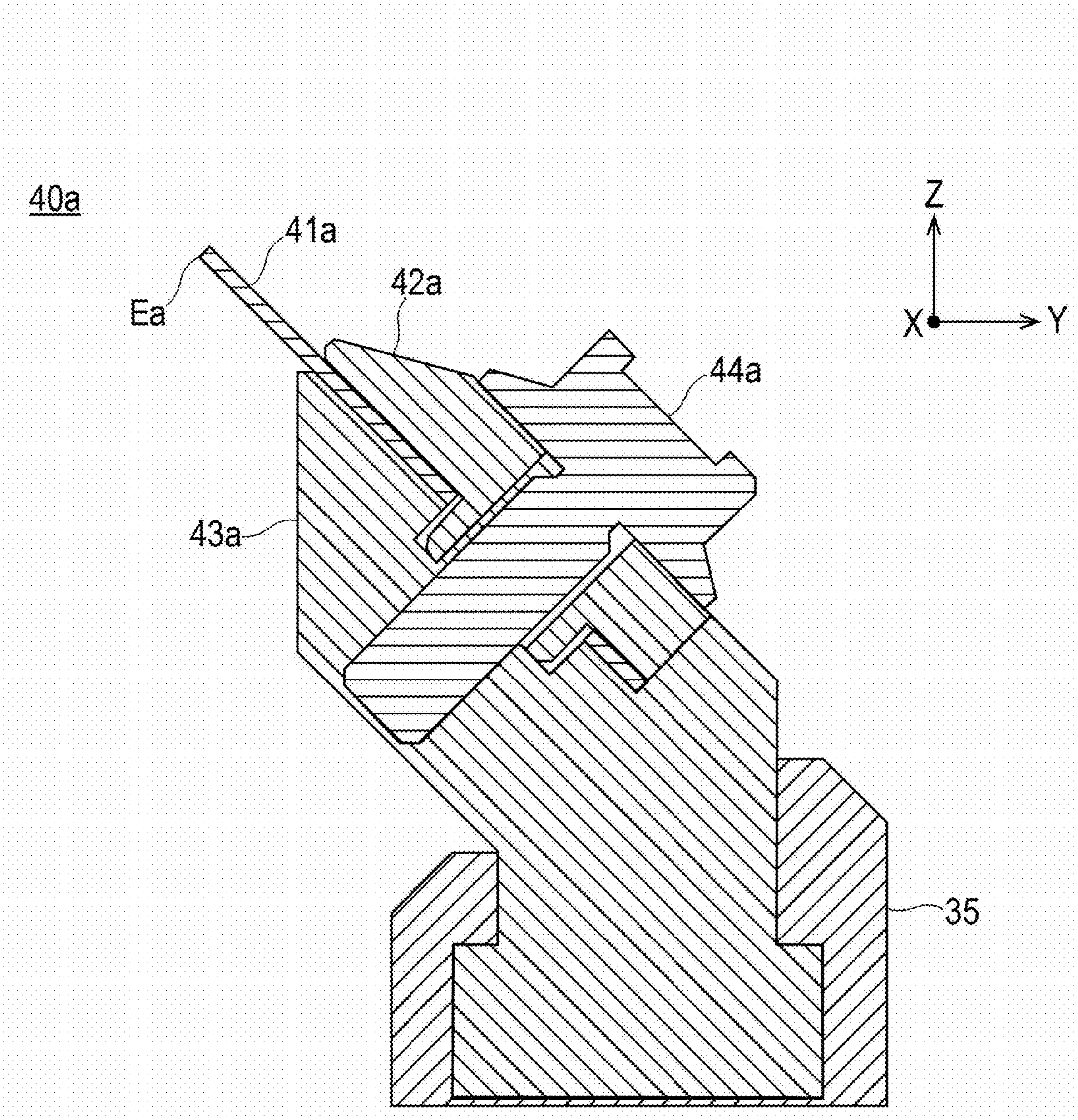
FIG. 8 is a cross-sectional view illustrating a scraping unit which is different from that in FIG. 4.

FIG. 8 is a cross-sectional view illustrating a scraping unit 40*a* according to a second embodiment. In the first embodiment, a description is made about a case where the scraping unit 40 is formed of POM or the like and includes the horizontal surface 41, the vertical surface 42, the first inclination portion 43, and the second inclination portion 44. However, a scraping unit can be configured as follows. Note that because the configurations other than the scraping unit of the scraping device in the present embodiment are similar to the configurations of the scraping device 100 of the first embodiment, descriptions thereof will not be made.

As illustrated in FIG. 8, the scraping unit 40*a* includes a deformation member 41*a*, clamping portions 42*a* and 43*a*, and a fixing portion 44*a*. The deformation member 41*a* is configured with a thermoplastic resin or the like such as POM to be elastically deformable, similarly to the first embodiment, and is configured to form a contact part which contacts the nozzle L. In a state where the deformation member 41*a* is elastically deformed (such that a protrusion shape is present on the left side when FIG. 8 is viewed), the viscous material m discharged from the nozzle L can thereby be scraped off by butting a distal end portion (corner portion Ea) of the deformation member 41*a* to the nozzle L.

The clamping portions 42*a* and 43*a* are configured to clamp the deformation member 41*a*. The clamping portion 42*a* can be arranged on an upper side in FIG. 8 as one side of the deformation member 41*a*, and the clamping portion 43*a* can be arranged on a lower side as another side of the deformation member 41*a*. As illustrated in FIG. 8, the clamping portions 42*a* and 43*a* are configured to clamp the deformation member 41*a* such that the deformation member 41*a* is positioned at approximately oblique 45°. The fixing portion 44*a* is configured to include a bolt or the like, to be mounted on the clamping portions 42*a* and 43*a*, and to thereby adjust fastening force on the deformation member 41*a* by the clamping portions 42*a* and 43*a*. A plurality of fixing portions 44*a* can be placed at predetermined intervals in a thickness direction (depth direction X) of the deformation member 41*a*.

In the scraping device configured in such a manner, similarly to the first embodiment, when a sensor detects that the nozzle L is arranged between a pair of scraping units 40*a*, the driving units 20 are controlled to cause the scraping units 40*a* to approach each other, and the deformation members 41*a* are caused to abut the inclined surface of the nozzle L. The deformation members 41*a* move until the nozzle L is retracted from a portion between the scraping units 40*a* and both of the scraping units 40*a* abut each other. Accordingly, the viscous material m adhering to the distal end portion (inclined surface) of the nozzle L is scraped off by the scraping units 40*a*.

As described above, the scraping unit 40*a* includes the deformation member 41*a* configured to be elastically deformable and forming the contact part which contacts the nozzle L, and the clamping portions 42*a* and 43*a* which form a pair and clamp the deformation member 41*a*. In such a configuration, the deformation members 41*a* are moved along a distal end surface of the nozzle L, and the viscous material m discharged from the nozzle L can thereby be scraped off.

Note that the present invention is not limited only to the above-described embodiments and can variously be changed within the scope of the claims.

The present invention encompasses the following aspects and forms.

1. A scraping device to be used for an applying system having a nozzle which is formed such that an outer wall surface is tapered toward a distal end, the scraping device including:
   - a pair of scraping units, each of which has a contact part for scraping a viscous material adhering to the outer wall surface; and
   - a driving unit which causes the pair of scraping units to approach to and separate from each other,
   - in which the nozzle is movable to be temporarily arranged between the pair of scraping units, and
   - the pair of scraping units move to approach each other when the nozzle is arranged between the pair of scraping units and approach each other until the contact parts abut each other due to movement as retraction of the nozzle from a portion between the pair of scraping units.

2. The scraping device which is described in the above item 1, in which, scraping unit forms the contact part with nozzle by a corner portion at which a horizontal surface extending in a horizontal direction intersects with a vertical surface extending in a vertical direction.
3. The scraping device which is described in the above item 1 or 2, in which the scraping unit includes a first inclination portion which is continuous with the horizontal surface and is inclined to be positioned further outward from the nozzle toward a lower area in a planar view and
   - a second inclination portion which is continuous with the vertical surface and is inclined to be positioned further outward from the nozzle toward the lower area in the planar view.
4. The scraping device which is described in any one of the above items 1 to 3, in which the scraping unit includes a deformation member that is configured to be elastically deformable and forms the contact part which contacts the nozzle, and clamping portions that form a pair and clamp the deformation member.
5. The scraping device which is described in any one of the above items 1 to 4, in which the pair of scraping units are formed to extend in a thickness direction which intersects with a vertical direction,
   - the pair of scraping units is mounted on mounting portions which are moved together with the pair of scraping units by the driving unit, and
   - each of the mounting portions is rotatable so as to adjust a direction of the scraping unit.

The present application is based upon Japanese Patent Application No. 2023-210866, filed on Dec. 14, 2023, the contents of disclosure of which are incorporated herein in their entirety by reference.

REFERENCE SIGNS LIST

100 scraping device
10 rails
20 driving unit(s)
30 moving unit(s)
35 mounting portion(s)
40, 40*a* scraping unit(s)
41 horizontal surface
41*a* deformation member(s)
42 vertical surface(s)
42*a* clamping portion(s)
43 first inclination portion
43*a* clamping portion
44 second inclination portion
E corner portion(s) (contact part)
m viscous material
P rotation axis
S outer wall surface
X depth direction (thickness direction)
Z vertical direction

The invention claimed is:

1. A scraping device to be used for an applying system having a nozzle which is formed such that an outer wall surface is tapered toward a distal end, the scraping device comprising:
- a pair of scraping units, each of which has a contact part for scraping a viscous material adhering to the outer wall surface; and
- a driving unit which causes the pair of scraping units to approach each other and to and separate from each other, wherein the nozzle is movable to be temporarily arranged between the pair of scraping units, and the pair of scraping units move to approach each other when the nozzle is arranged between the pair of scraping units and approach each other until the contact parts abut each other due to retraction of the nozzle from a position between the pair of scraping units.

2. The scraping device according to claim 1, wherein, each scraping unit contact part comprises a corner portion at which a horizontal surface extending in a horizontal direction intersects with a vertical surface extending in a vertical direction.

3. The scraping device according to claim 2, wherein each scraping unit includes a first inclination portion which is continuous with the horizontal surface and is inclined in a direction further outward from the nozzle toward a lower area in a planar view and a second inclination portion which is continuous with the vertical surface and is inclined in a direction further outward from the nozzle toward the lower area in the planar view.

4. The scraping device according to claim 1, wherein each scraping unit includes a deformation member that is configured to be elastically deformable and forms the contact part which contacts the nozzle, and a pair of clamping portions that clamp the deformation member.

5. The scraping device according to claim 1, wherein the pair of scraping units are each formed to extend in a thickness direction which intersects with a vertical direction, the pair of scraping units is mounted on mounting portions which are moved together with the pair of scraping units by the driving unit, and each of the mounting portions is rotatable so as to adjust a direction of the scraping units.

* * * * *